United States Patent
Sun et al.

(10) Patent No.: US 7,423,834 B1
(45) Date of Patent: Sep. 9, 2008

(54) CONVOLUTION BASED MULTIPLE HARMONIC FREQUENCY REPEATABLE RUNOUT COMPENSATION METHOD AND APPARATUS

(75) Inventors: Yu Sun, Fremont, CA (US); Don Brunnett, Pleasanton, CA (US)

(73) Assignee: Maxtor Corporation, Scotts Valley, CA (US)

( * ) Notice: Subject to any disclaimer, the term of this patent is extended or adjusted under 35 U.S.C. 154(b) by 493 days.

(21) Appl. No.: 11/005,130

(22) Filed: Dec. 6, 2004

Related U.S. Application Data (60) Provisional application No. 60/527,054, filed on Dec. 4, 2003.

(51) Int. Cl.
*G11B 5/596* (2006.01)
(52) U.S. Cl. .................................................. 360/77.04
(58) Field of Classification Search ............... 360/75, 360/77.04, 77.06, 77.08
See application file for complete search history.

(56) References Cited

U.S. PATENT DOCUMENTS

| | | | | |
|---|---|---|---|---|
| 4,536,809 | A | 8/1985 | Sidman | 360/77.04 |
| 6,115,203 | A | 9/2000 | Ho et al. | 360/77.04 |
| 6,549,362 | B1 * | 4/2003 | Melrose et al. | 360/77.04 |
| 6,977,792 | B1 * | 12/2005 | Melrose et al. | 360/75 |
| 7,085,094 | B1 | 8/2006 | Heimbaugh et al. | 360/77.04 |
| 7,106,547 | B1 * | 9/2006 | Hargarten et al. | 360/77.04 |

* cited by examiner

*Primary Examiner*—Fred Tzeng
(74) *Attorney, Agent, or Firm*—Fellers, Snider, et al.

(57) ABSTRACT

Real-time correction of repeatable runout for multiple harmonic frequencies is provided by using convolution of a position error signal, or similar real-time signal, with an impulse response of a specific transfer function, such as the inverse of the disturbance transfer function. Multiple harmonic frequencies can be followed substantially simultaneously to achieve small position error and good tracking misregistration (TMR) performance. The impulse response can be obtained, calculated and stored off-line. The impulse response can be configured to substantially eliminate correction of one or more frequency or frequency ranges. Convolution can be done relatively quickly with proper arrangement of memory.

37 Claims, 5 Drawing Sheets

CONVOLUTION BASED MULTIPLE HARMONIC FREQUENCY REPEATABLE RUNOUT COMPENSATION METHOD AND APPARATUS

CROSS-REFERENCE TO RELATED APPLICATIONS

Priority is claimed from U.S. Provisional Patent Application Ser. No. 60/527,054, entitled "Convolution Based Multiple Harmonic Frequency Repeatable Runout Compensation," filed Dec. 4, 2003, which is incorporated herein by reference in its entirety.

FIELD OF THE INVENTION

The present invention relates to a method and apparatus for reducing computational load associated with correction of repeatable runout in a disk drive (or other data recording device) and, in particular, to a method and apparatus that uses convolution for real-time runout correction.

BACKGROUND INFORMATION

A number of data recording and/or playback devices, including magnetic disk drives, have rotating components which can lead to a phenomenon generally referred to as runout. In the case of a magnetic disk drive, in an idealized drive configured with nominally concentric data tracks, if a read/write head is kept a constant radial distance from the (nominal) axis of rotation, there will be no change in the distance (if any) from the read/write head to the desired data track, as the disk rotates. In actuality, however, many factors can contribute to deviations from this ideal condition such that small tracking correction forces must be applied to the read/write head to maintain the head sufficiently aligned with a desired data track, as the disk rotates. Although some amount of tracking error (e.g., a few percent, such as around 8 percent, expressed in terms of percentage of track-to-track distance) can be tolerated, most modern disk drives provide apparatuses and procedures for making tracking corrections to assist in maintaining tracking within acceptable ranges.

Typically, deviations of the actual track location from the ideal concentric location (i.e., "runout") can be considered to include repeatable components (i.e., at least partially predictable and, therefore, correctible) and non-repeatable components. In at least one approach, actual tracking errors are measured, and attempts are made to distinguish repeatable from non-repeatable components, so that steps can be taken to at least partially correct for the repeatable components. Many techniques for determining or approximating repeatable runout (RRO) involve measurements taken over multiple sectors and/or multiple revolutions and, thus, can be somewhat time-consumptive. Accordingly, it is generally desirable to employ procedures which converge on an RRO estimate relatively quickly.

Repeatable runout can also be considered as having both substantially static and dynamic components. Components of repeatable runout which first occur after the servo sector write process (and which, typically, can change their amplitude and/or phase, e.g., with temperature) will be referred to herein as "live" RRO. Static components, which remain (or are assumed to remain) substantially unchanged over time and/or in response to environmental changes, are (in at least some approaches) measured, and appropriate runout corrections are written into some or all servo sectors for each track (termed "embedded runout correction" or ERC). ERC is typically performed as part of a drive manufacturing process, i.e. substantially "off-line," and the ERC corrections are calculated and written before the drive is provided to the user, and/or before normal read/write operation of the drive is commenced.

One approach to ERC involves convolving position error signal (PES) RRO values with the inverse impulse response of the servo system of the disk drive, e.g. as described in U.S. Pat. No. 6,549,362, incorporated herein by reference. However, even after ERC is applied, there may be an amount of runout which still occurs and which may change over time or in response to environmental changes.

In at least some approaches, active or "adaptive" runout correction is used to at least partially correct for such dynamic runout. One general approach for adaptive repeatable runout correction (ARC) involves performing a processor "interrupt" (in response to encountering each servo sector) to execute a Fourier transform technique to determine the power or amplitude of the base frequency (typically the disk rotational rate) component of dynamic RRO and/or of various harmonics (typically second through $n^{th}$ harmonics). The determination of the power frequency distribution for the dynamic runout is then used to calculate corrections such as ARC feed-forward ("ARCFF") values which (appropriately converted and conditioned) are combined with a position error signal (PES) or other tracking signal in such a way as to drive the head toward to a zero tracking error position.

In at least some configurations, calculation of the Fourier transform and/or the feed-forward signal is performed by circuitry such as a programmed microprocessor, (although other processing equipment such as an application specific integrated circuit ("ASIC") or gate arrays may be involved). This circuitry typically is also used for other purposes during operation of the disk drive. Accordingly, the computational load which is devoted to RRO correction must be kept low enough that sufficient computational resources remain available for other functions.

Unfortunately, the trends in recent disk drives, especially trends towards higher data density and towards lower unit costs, generally, have increased the computational load (e.g. increased time, code space, memory space and/or servo ISR time requirements) associated with RRO correction. For example, higher spatial density of data on the surface of the disk involves smaller track-to-track distances, thus, typically requiring greater tracking accuracy, including more accurate RRO correction. Mechanical system simplification can result in degraded RRO containment.

Often, providing the desired RRO correction accuracy includes calculating for higher harmonics which, using previous methods, could increase computational load to an undesirable level. Furthermore, increased data density may involve a larger number of servo sectors per track, thus, (for a constant rotation rate) reducing the amount of time between successive servo sectors. Accordingly, even when the amount of RRO correction calculations for each sector remains constant, as the sector period becomes smaller, the percentage of each sector transit time devoted to RRO correction increases.

Accordingly, it would be useful to provide apparatuses and methods which can reduce the computational load associated with real-time RRO correction (correction which is calculated and applied during normal read/write operations), preferably, without reducing accuracy of the corrections to an unacceptable degree.

SUMMARY OF THE INVENTION

The present invention includes a recognition of the source, nature and/or existence of problems in previous approaches, including those described herein.

According to one embodiment of the invention, repeatable runout corrections are based on a convolution operation which is performed, at least, partially in "real-time", i.e., during the course of normal read/write operations of a disk drive. The convolutions performed between a first series of values based on position error signals (at least some of which are obtained in real-time) and another series of values based on the disk drive's impulse response (which may be, at least, partially calculated "off-line," i.e., before normal read-write use, such as during the manufacture or qualification process and stored, e.g., on the disk). According to one embodiment, a single point convolution is performed. This is believed to provide a computationally efficient process and contribute to the ability to perform the necessary convolution in real-time. According to one embodiment of the invention, the impulse response or "kernel" is configured or modified to substantially eliminate correction for one or more higher harmonics and, preferably, to provide correction substantially only for harmonics below a predetermined harmonic.

In one embodiment, real-time correction of repeatable runout for multiple harmonic frequencies is provided by using convolution of a position error signal, or similar real-time signal, with an impulse response of a specific transfer function such as the inverse of the disturbance transfer function. Multiple harmonic frequencies can be followed substantially simultaneously to achieve small position error and good tracking misregistration (TMR) performance. The impulse response can be obtained, calculated and stored off-line. The impulse response can be configured to substantially eliminate correction of one or more frequency or frequency ranges. Convolution can be done relatively quickly with proper arrangement of memory.

DETAILED DESCRIPTION OF THE PREFERRED EMBODIMENT

Figure 1:
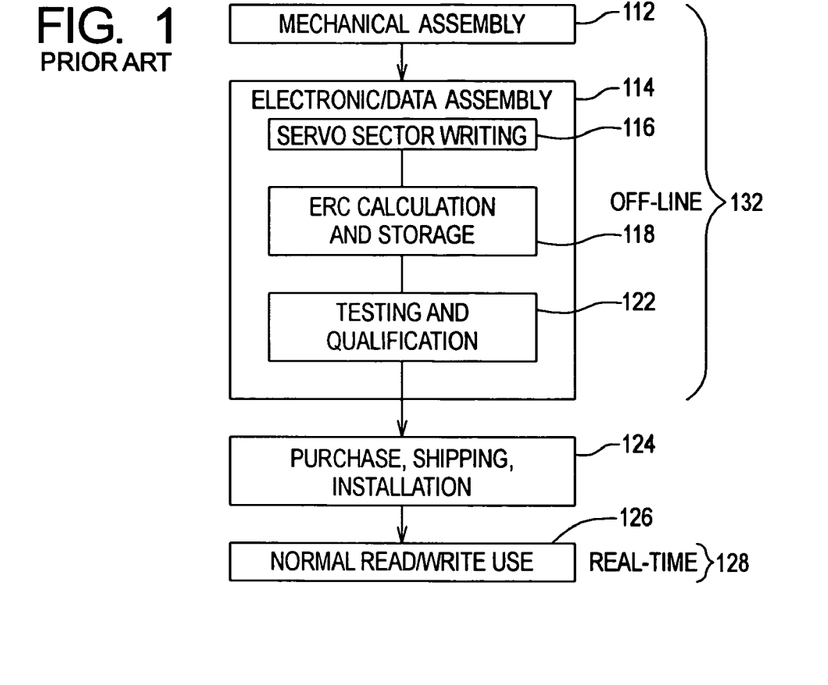
FIG. 1 is a flowchart showing a portion of a typical disk drive's lifetime.

FIG. 1 illustrates a portion of a typical disk drive lifetime. Although there are many potential variations, FIG. 1 is useful for illustrating the distinction between real-time processes and off-line processes. As shown in FIG. 1, following mechanical assembly 112, a series of processes that may be called electronic or data assembly 114 are performed such as servo sector writing 116, ERC calculation and storage 118, testing and qualification 122 and the like. Following purchase, shipping and installation of qualified disk drives 124, disk drives are provided for a (typically extended) period of normal read/write use 126, such as in the example of the familiar use of disk drives during normal use of a personal computer.

The general period of time of normal read/write use is sometimes referred to as real-time 128, as opposed to, for example, procedures which are performed off-line 132, such as during electronic or data assembly procedures. Although real-time operations are those which occur during normal read/write use of the drive, this does not mean that the calculations are necessarily performed at the same time the head is performing, e.g., write operations. Real-time processes can include processes which are performed, e.g., substantially during, or in response to, passage of the head over a non-user-data area such as a servo area. Preferably, real-time procedures are performed with little, if any, user-perceptible interruption or delay of read operations or write operations during normal use of the disk drive.

Thus, ERC calculation and storage 118 is normally an off-line procedure 132. The correction of head location which constitutes ERC is performed during real-time 128. However, the values on which the ERC corrections are based are calculated and stored at a previous time, typically during the off-line period 132. Thus, ERC cannot react to events or circumstances occurring in real-time. ERC is further unable to correct for the effects of mechanical shocks, e.g., which can cause the disk to slip and/or clamping forces to change (thus resulting in multiple RRO components).

One advantageous aspect of ERC approaches is that, since calculations are substantially performed off-line, it is possible to use ERC calculations which require a substantial amount of time to complete. Real-time runout calculations, such as DFT-based ARC, base the correction calculations on signals or measurements made during real-time, i.e., during normal read/write use of the drive. In a typical previous ARC approach, the position error signal is fed into an RRO feed-forward calculation block, which performs calculations of the feed-forward value, e.g., using discrete Fourier transform (DFT) methods and the like. The feed-forward value is then summed together with the control output to form the feed-forward path.

However, for runout correction to be performed in real-time, the needed calculations and procedures must be performed rapidly enough that they produce little, if any, user-perceptible interruption or delay of normal read/write operations. For example, some or all DFT-based ARC procedures may be substantially completed during the series of interrupt service requests (ISR) which occur as the head passes over each of the various servo areas on the track (and preferably are substantially completed before the head reaches the data areas of the track).

Figure 2:
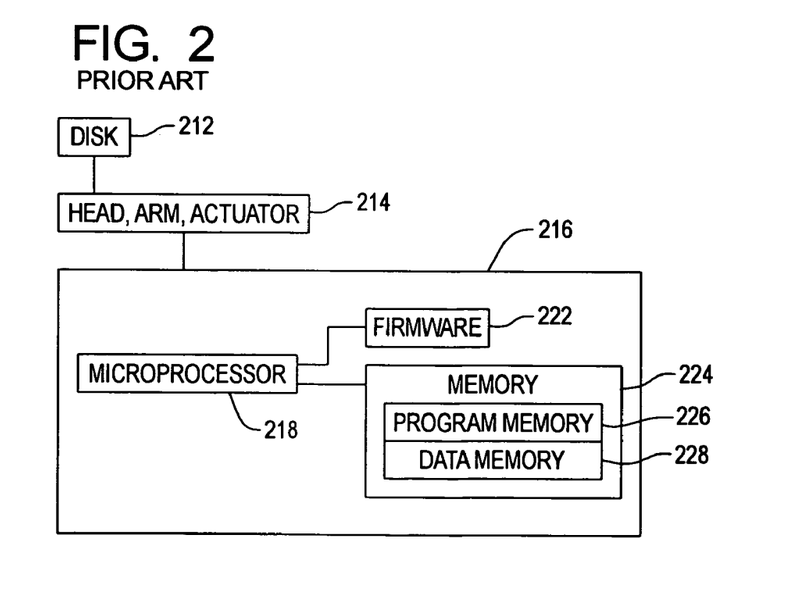
FIG. 2 is a block diagram of selected components of a typical disk drive.

FIG. 2 provides, in block diagram form, an overview of selected components typically found in a disk drive. The disk 212 is rotatably-mounted near the read/write head of a head-arm-actuator assembly 214. The positioning of the read/write head with respect to the data surface of the disk 212, as well as the processing of signals, data and the like, is provided by the drive's control and signal processing devices 216. In a typical disk drive, a microprocessor 218 is controlled, at least partially, by firmware 222. The microprocessor 218 is coupled to memory 224 which can include, e.g., program memory 226 and/or data memory 228.

Figure 3A:
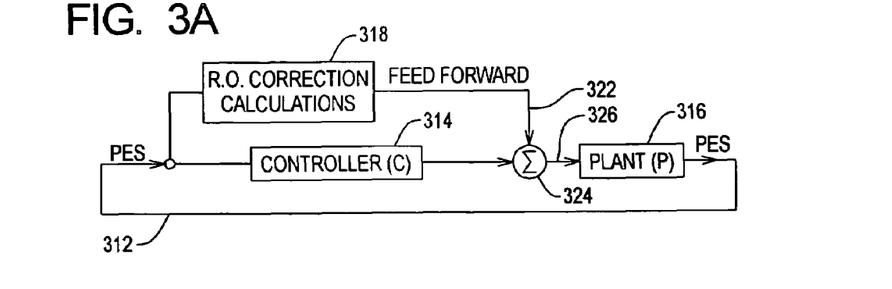
FIG. 3A is a block diagram of a control system according to an embodiment of the present invention.

FIG. 3A provides, in control system block diagram form, an overview of a tracking control system including runout correction which can be used in accordance with embodiments of the present invention. In the system shown in FIG. 3A, a position error signal (PES) 312 indicative of tracking errors, is provided to a controller 314 which outputs a control signal to the plant 316 (in a disk drive, typically the actuator and/or voice coil motor which positions the head). A repeatable runout correction calculation component 318 (which may be embodied by a microprocessor 218 programmed to operate, e.g., as described herein) also receives the PES signal 312 and calculates a feed-forward signal 322 which is substantially configured, when summed 324 with the controller output, to provide an input 326 to the plant 316 which will, at least, partially correct runout. The plant 316 controls the head position to achieve desired tracking. The PES signal 312 indicates the magnitude of error in the tracking.

Figure 4:
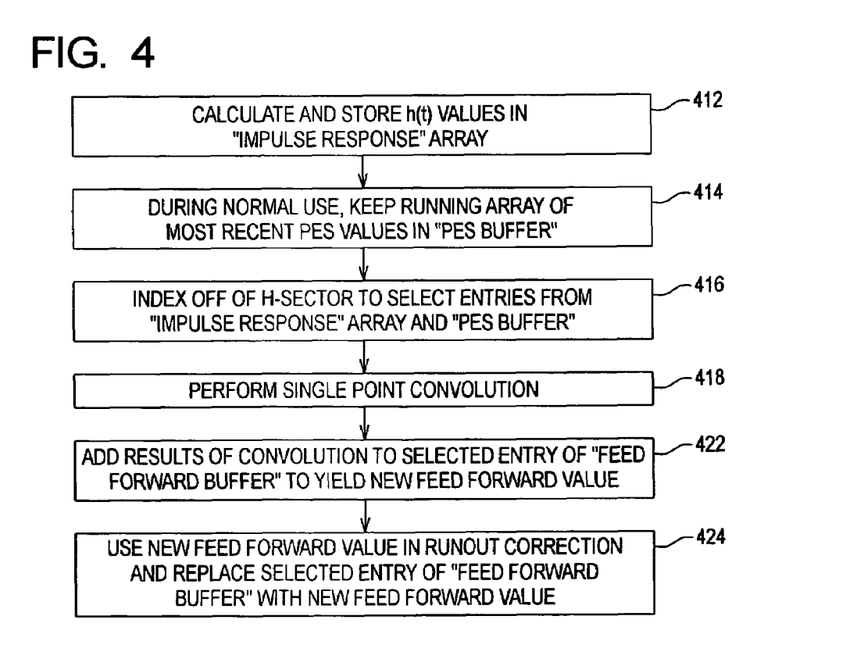
FIG. 4 is a flowchart of a procedure according to an embodiment of the present invention.

FIG. 4 is a flowchart showing a runout correction procedure according an embodiment of the present invention. As shown in FIG. 4, an impulse response function or series h(t) is calculated and the results are stored in an "impulse response" array 412. Preferably, the impulse response is calculated and stored once for each disk drive, such as during the off-line period 132, although there is no theoretical reason why the impulse response could not be calculated (or modified or updated) at other times. It is anticipated that the impulse response information will be stored on the disk 212, so that it is available for use as described below (although some or all of the impulse response data may be placed in memory 224 for use in various calculations including those described herein).

Figure 5:
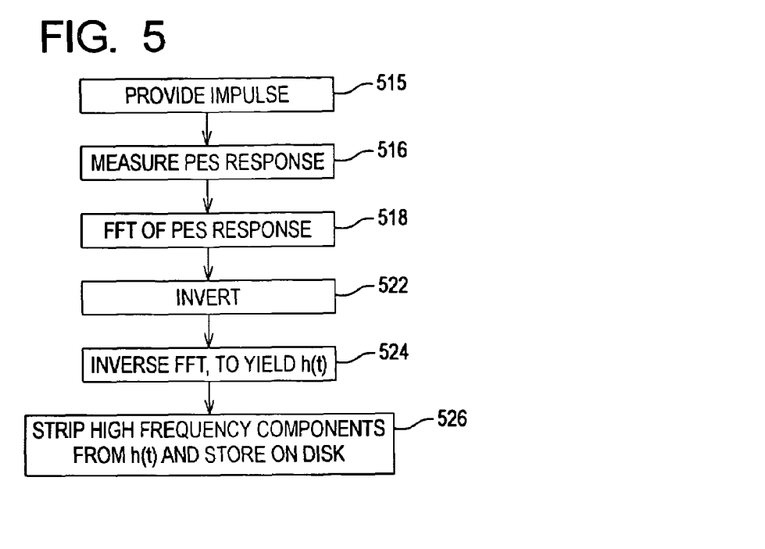
FIG. 5 is a flowchart of a procedure according to an embodiment of the present invention.

The impulse response of the intended transfer function can be obtained in several ways. It is possible, for example, to base the impulse response on a numerical model. FIG. 5 depicts a procedure in which an impulse response is based on in-drive measurements. Basing the impulse response on the in-drive measurements can be useful when it is desired to reduce or eliminate inconsistencies that can arise from mechanical differences between drives.

In the illustration of FIG. 5, a fictitious impulse 515 is generated by software and added to the control output 326 (see FIG. 3A). One revolution of PES is measured 516 on a servo sector by servo sector basis. The fast Fourier transform (FFT) of the PES response is calculated 518. The result of FFT is inverted 522 and the inverse FFT of the result is calculated to yield the impulse response h(t) 524.

It is possible to vary or modify the impulse response for various purposes. For example, the impulse response can be modified to achieve a desired choice of harmonic frequency and/or adaptation gain. Those of skill in the art will understand how to modify a kernel or impulse response for such purposes.

In the embodiment depicted in FIG. 5, the high frequency components are stripped from h(t) 526 and the resultant modified impulse response is stored on the disk. Eliminating all frequencies or harmonics above a particular harmonic is believed useful to improve computational efficiency. It has been found (empirically) that it is relatively uncommon to have significant real-time or "live" repeatable runout at high frequencies. Additionally, the plant 316 typically has relatively low gain at high frequencies (such as above about 3 kHz). Thus, to correct RRO at such high frequencies, the feed forward value can easily become large enough to saturate the digital-to-analog converter (DAC) range. In one embodiment, all frequencies at or above 3,000 Hz (3 kHz) are substantially removed. In another embodiment, all frequencies above about 24 F (where F is the root frequency or disk rotation rate) are removed. In another embodiment, the kernel is cut-off at 30 F. In one embodiment, one 1 F is substantially equal to 120 Hz.

Figure 6:
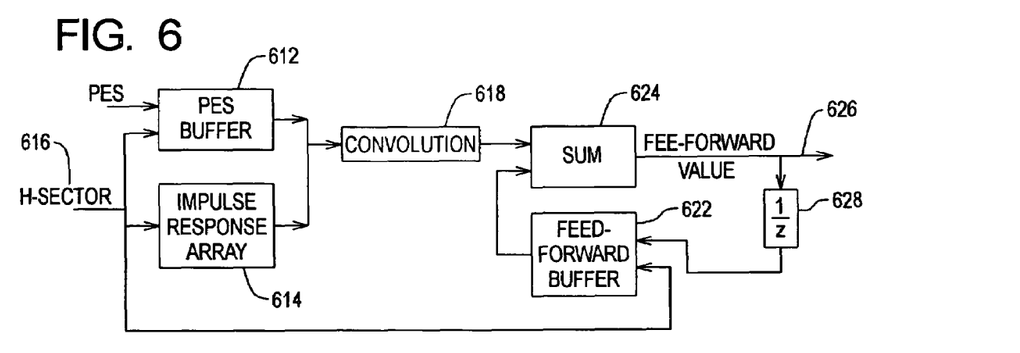
FIG. 6 is a block diagram of certain components used in some embodiments of the present invention.

Returning to FIG. 4, during normal use of the disk drive, an array is provided to store a "running" account of the most recent PES values 414. FIG. 6 is a block diagram illustrating certain components used in embodiments of the present invention. In the illustration of FIG. 6, the running PES values are stored in the PES buffer 612, while the impulse response values (or portions thereof) are stored in the impulse response array 614. In one embodiment, the PES buffer 612 and impulse response array 614 hold at least one revolution's worth of data, indexed by the hard-sector (h-sector or servo sector) defined along each track of the disk. The h-sector 616 is used as an index to select entries from the impulse response array 614 and the PES buffer 612 (see 416 of FIG. 4). At a particular h-sector, the kernel h(t) and the PES buffer are convolved 618 for one point only together.

In one embodiment, the disk drive memory is used in a fashion to provide relatively fast convolution. For example, it is believed that relatively fast convolution can be enhanced by putting the kernel h(t) in the program memory 226 and the PES buffer in the data memory 228. As shown in equation (1), the result of the convolution, multiplied by a gain factor, is added to the previous runout correction value (e.g., for a particular track and sector) to obtain a new or updated runout correction value.

$$rro_{k+1} = rro_k + conv(PES(t), h_k(t)) * g(t) \quad (1)$$

where
$rro_{k+1}$ = the new runout correction value;
$rro_k$ = the previous runout correction value;
conv = the convolution operator;
PES(t) = the position error signal for the $t^{th}$ sector;
$h_k$ = the impulse response for the $t^{th}$ sector of this track; and,
g = the gain of the rro correction system.

In general mathematical terms, the convolution between two functions or series can be expressed by equation (2).

$$conv(f(x), h(x)) = \sum_{all\ k} h(x-k) f(k) \quad (2)$$

where h(x)=the impulse response or kernel.

Figure 7:
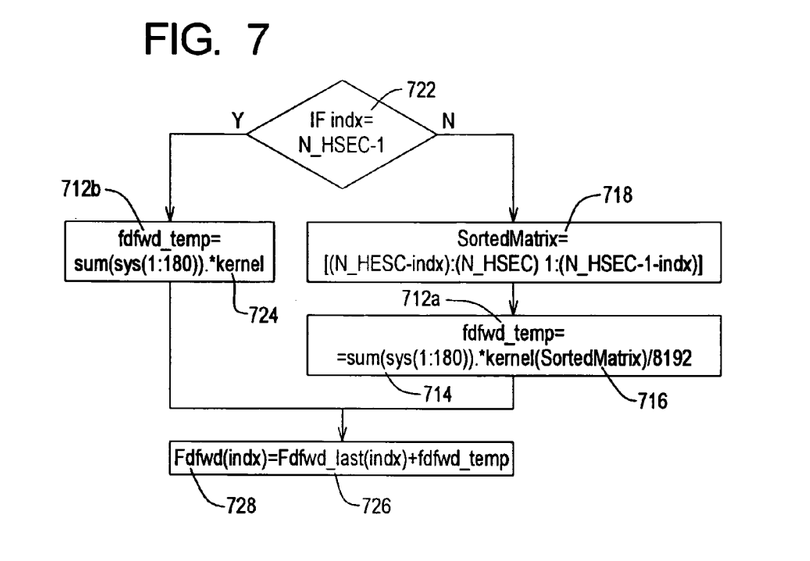
FIG. 7 is a flowchart of a procedure according to an embodiment of the present invention; and, FIGS. 8A-8C, respectively, are graphs of simulated RRO, head position and position error, over a period of time, expected to result from embodiments of the present invention.

In at least some embodiments of the present invention, in order to provide for desired computational efficiency, a single point convolution is calculated. FIG. 7 illustrates a procedure for performing single point convolution according to an embodiment of the present invention using pseudo-code notation and, with the variables having the meanings shown in Table 1.

TABLE 1

| | |
|---|---|
| N_HSEC | The number of h-sectors in the current track |
| Indx | Ranges from 0 to N_HSEC-1 |
| fdfwd_temp | An array for temporarily holding a feed-forward update value |
| sys (1:180) | An array for holding PES values for the most recent rotation |
| 8192 | Normalizing value |
| Fdfwd | An array for holding the current feed-forward values for each h-sector |
| fdfwd_last | An array for holding the previous feed-forward values |

In the procedure of FIG. 7, temporary feed-forward values are calculated by multiplying the PES array 712a by the kernel, which has been indexed 716 in a manner to effectively reorder or sort the kernel 718 (unless the index happens to be the maximum value in the range of the index 722, in which case the temporary feed-forward value 712b does not require reordering of the kernel 724). The reordering of the kernel according to the illustrated embodiment, effectively steps through the kernel beginning with the difference between the number of h-sectors and the index (N_HSEC-indx), and incrementing until N_HSEC is reached, whereupon the first value of the kernel is used and the entry is incremented until all N_HSEC values have been used. The result is summed with the last feed-forward value 726 at this h-sector (obtained from the feed-forward buffer 622, 624) to get the updated feed-forward value 626 of FIG. 6, 728 of FIG. 7, 422 of FIG. 4. This then provides a new feed-forward value 322 for use in runout correction 424 of FIG. 4. The new feed-forward value is also (after a delay 628) used to replace the previously selected entry of the feed-forward buffer.

In at least some embodiments, it is preferred to use a relatively small gain value, such as the substantially smallest value which will achieve convergence in the desired amount of time, since a large gain value can lead to unwanted consequences such as amplification of non-repeatable runout.

Figure 8A:
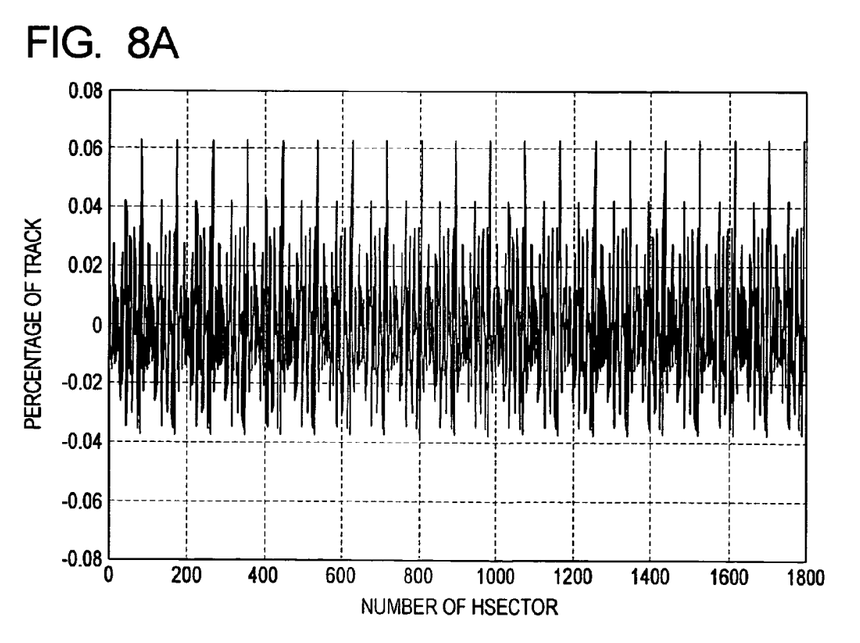
Figure 8B:
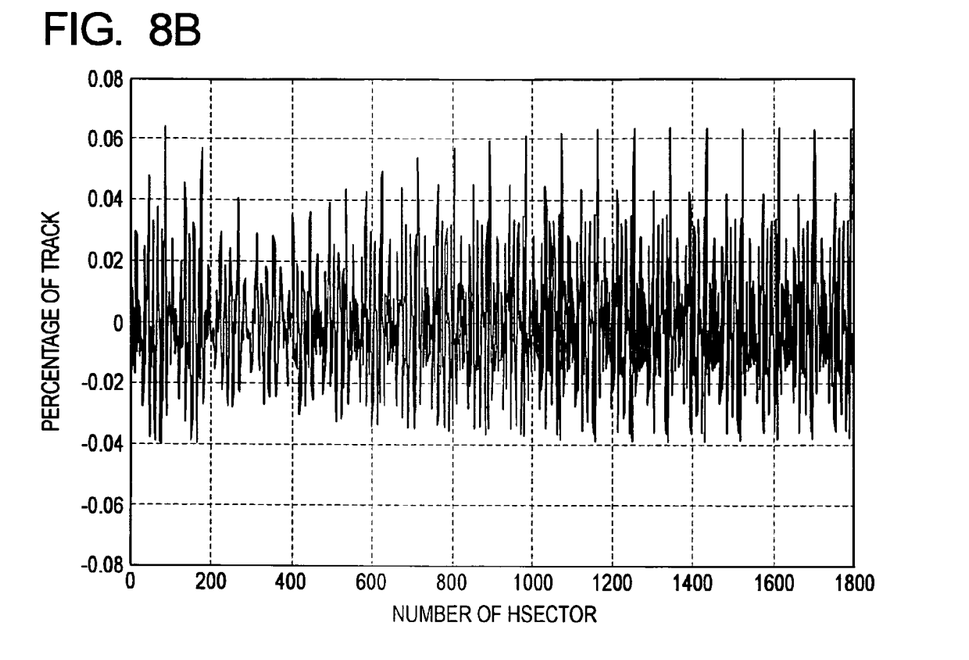
Figure 8C:
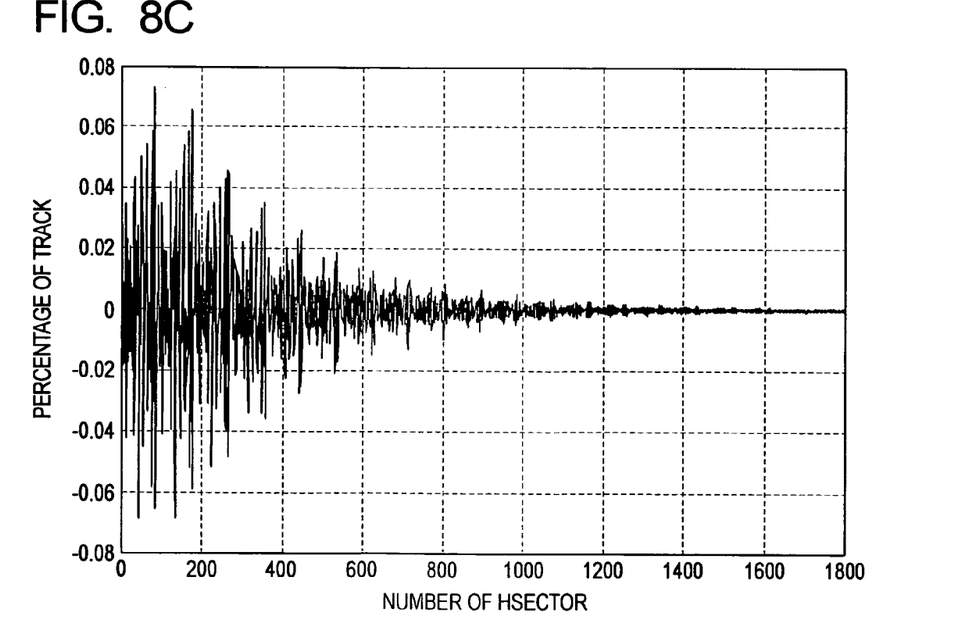

FIGS. 8A-8C respectively illustrate simulated RRO, head position and position error (expressed as percentage of track width) over a period of time (expressed as the number of h-sectors traversed). Although these are simulated results, they illustrate behavior which is expected to result from embodiments of the present invention. As shown in FIG. 8C, PES substantially converges toward a zero value over time.

A number of variations and modifications of the invention can be used. It is possible to use some features of the invention without using others. For example, it is possible use convolution-based calculations for correcting live RRO without stripping frequencies from the impulse response array. Although various procedures have been described in connection with embodiments of the present invention, it is possible to use other procedures including procedures having more or fewer steps or procedures in which the steps are performed in a different order.

In one embodiment, it would be possible to do a full calibration on all data-disk zones and to record the feed-forward values during the drive's start-up sequence. Then, in real-time operation, at the beginning at the next seek, the zone feed-forward table can be updated based on the latest revolution's worth of PES data, preferably with a small adaptation gain. This approach is believed to have the ability to track slow-change RRO relatively well.

Although embodiments of the present invention have been described in the context of an electromagnetic "hard" disk drive, some or all aspects of the present invention can be used in other contexts, including various information or data-recording systems having a rotating medium such as compact disks (CD's), digital versatile disks (DVD's) or other optical disks.

Although the present system provides certain advantages when compared to other runout correction approaches, there is no theoretical reason why some or all aspects of the present invention cannot be combined with other approaches including embedded runout correction, discrete Fourier transform (DFT) based ARC approaches, and the like.

Figure 3B:
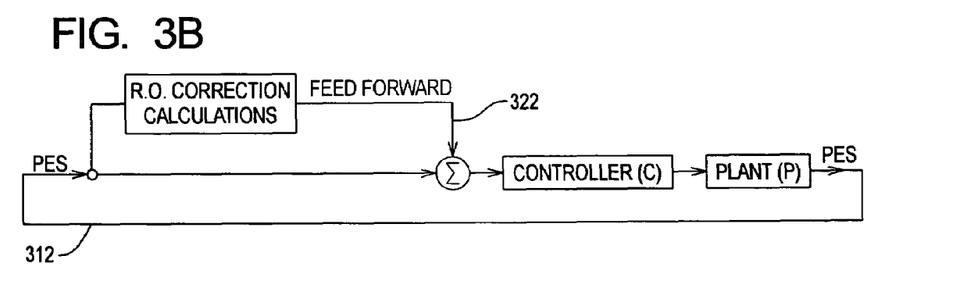
FIG. 3B is a block diagram of a control system according to an embodiment of the present invention.

In one embodiment, ERC is used to remove all the incoherent part of the RRO (mostly written in) while embodiments of the present invention follow the coherent part of the RRO. In one embodiment, rather than adding the feed-forward value into the controller output as shown in FIG. 3A, it would be possible to add the feed-forward value 322 back into the PES, as shown in FIG. 3B. In this case, the kernel would be changed to reflect the inverse, closed-loop transfer function.

In light of the above description, a number of advantages of the present invention can be seen. The method can be used to deal with multiple frequency RRO substantially simultaneously. The computation time, memory requirement and code space substantially do not increase with the number of harmonics to be corrected. The present invention provides for performing convolution relatively fast with the proper arrangement of memory. The present invention provides the ability to remove inconsistencies due to mechanical differences between drives. The present invention can be used to correct multiple-harmonic-frequency-RRO simultaneously, without requiring extra memory and computation time.

The present invention, in various embodiments, includes components, methods, processes, systems and/or apparatus substantially as those depicted and described herein, including various embodiments, sub-combinations, and subsets thereof. Those with skill in the art will understand how to make and use the present invention after understanding the present disclosure. The present invention, and various embodiments, includes providing the devices and processes in the absence of items not depicted and/or described herein or in various embodiments hereof, including in the absence of such items as may have been used in previous devices or processes, e.g., for improving performance, achieving ease of implementation and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the forms or form disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/ or equivalent structures, functions, ranges or steps are disclosed herein, and without intending to publicly dedicate any patentable subject matter.

What is claimed is:

1. A data read/write apparatus, comprising:
controller circuitry configured to position a read/write head adjacent the a rotatable storage medium so as to at least partially correct for repeatable runout based on convolving a first array of values obtained from a first tracking signal with a second array of values indicative of an impulse response of said data read/write apparatus, and
a first memory and a second memory, wherein during at least a first time period, one of said first and second memory is used to store program information and the other of said first and second memory is used to store read/write data, and wherein during at least a second time period, said first memory is used to store said first array of values and said second memory is used to store said second array of values.

2. Apparatus, as claimed in claim 1, wherein said first tracking signal is obtained from a position error signal.

3. Apparatus, as claimed in claim 1, wherein said second array of values indicative of an impulse response is based on modeling of said data read/write apparatus.

4. Apparatus, as claimed in claim 1, wherein said second array of values indicative of an impulse response is read from RRO correction fields on the medium.

5. Apparatus, as claimed in claim 1, wherein said second array of values indicative of an impulse response is the result of eliminating at least some frequencies from said impulse response.

6. Apparatus, as claimed in claim 1, wherein said second array of values indicative of an impulse response is the result of eliminating, from said impulse response, frequencies above a maximum frequency.

7. Apparatus, as claimed in claim 6, wherein said maximum frequency is about 3 kHz.

8. Apparatus, as claimed in claim 6, wherein said maximum frequency is about 30 times said rotation rate.

9. Apparatus, as claimed in claim 6, wherein said maximum frequency is about 24 times said rotation rate.

10. A method comprising:
obtaining at least a first tracking signal during transfer of user data between a host and user data sectors of a rotatable storage medium;
convolving a first array of values from said first tracking signal with a second array of values indicative of an impulse response of said rotatable storage medium; and
modifying said second array indicative of an impulse response to eliminate, from repeatable runout correction, frequencies above a maximum frequency of about 24 times a rotational rate of the medium.

11. A method, as claimed in claim 10, wherein said first tracking signal is a position error signal.

12. A method, as claimed in claim 10, wherein said array of values indicative of an impulse response is based on modeling of said rotatable storage medium.

13. A method, as claimed in claim 10, further comprising a step of generating an impulse by software added to the control output in order to modify an existing impulse response.

14. The method of claim 13, further comprising a step of calculating a Fast Fourier Transform of said position error response.

15. The method of claim 13, further comprising a step of inverting the result of said Fast Fourier Transform calculation.

16. The method of claim 13, further comprising a step of calculating an array indicative of an impulse response using the inverse Fast Fourier Transform and said inverted result.

17. A method, as claimed in claim 10, further comprising a step of modifying said second array indicative of an impulse response to eliminate at least some frequencies from repeatable runout correction.

18. A method, as claimed in claim 10, wherein said maximum frequency is about 3 kHz.

19. A method, as claimed in claim 10, wherein said maximum frequency is about 30 times said rotation rate.

20. A method, as claimed in claim 10, wherein said step of convolving comprises performing a single-point convolution.

21. The method of claim 10, further comprising a step of outputting an output signal which includes a component which positions said read/write head so as to at least partially correct for repeatable runout, said output signal based on the results of said convolving.

22. A method comprising:
calculating a first array of numbers indicative of an impulse response,
storing said first array,
storing a second array based on a position error obtained during transfer of data between a host and user data sectors on the rotatable storage medium;
convolving said second array with said first array to provide a convolution result;
outputting a control signal that includes said convolution result to at least partially correct repeatable runout; and
modifying said first array to eliminate, from repeatable runout correction, frequencies above a maximum frequency of about 3 kHz.

23. A method, as claimed in claim 22, further comprising a step of calculating said first array of numbers indicating an impulse response based upon a modified impulse response.

24. A method, as claimed in claim 22, further comprising modifying said first array to eliminate at least some frequencies from said repeatable runout correction.

25. A method, as claimed in claim 22, wherein said maximum frequency is about 30 times said rotation rate.

26. A method, as claimed in claim 22, wherein said maximum frequency is about 24 times said rotation rate.

27. An apparatus comprising:
means for storing a first array of values obtained from at least a first tracking signal obtained during transfer of data between a host and user data sectors on a data storage medium;
means for convolving said first array of values with a second array of values, said second array of values being indicative of an impulse response of said apparatus, to provide convolution results; and
means for using said convolution results to output a signal which includes a component which positions a read/write head so as to at least partially correct for repeatable runout.

28. Apparatus, as claimed in claim 27, wherein said first tracking signal is a position error signal.

29. Apparatus, as claimed in claim 27, wherein said second array of values is based on modeling of said disk drive.

30. Apparatus, as claimed in claim 27, further comprising: means for calculating said second array, based on a plurality of measurements.

31. Apparatus, as claimed in claim 27, further comprising: means for modifying said second array to eliminate at least some frequencies from repeatable runout correction.

32. Apparatus, as claimed in claim 27, further comprising: means for modifying said second array to eliminate, from repeatable runout correction, frequencies above a maximum frequency.

33. Apparatus, as claimed in claim 32, wherein said maximum frequency is about 3 kHz.

34. Apparatus, as claimed in claim 32, wherein said maximum frequency is about 30 times said rotation rate.

35. Apparatus, as claimed in claim 32, wherein said maximum frequency is about 24 times said rotation rate.

36. Apparatus, as claimed in claim 27, wherein said means for convolving comprises means for performing a single-point convolution.

37. Apparatus, as claimed in claim 27, wherein said means for convolving comprises a microprocessor.

* * * * *